Feb. 16, 1971 R. FISCHER 3,563,073
DEVICE FOR COMPENSATING FOR THE SPRINGING IN
MACHINES, PARTICULARLY IN FORGING
PRESSES AND THE LIKE
Filed March 12, 1968

INVENTOR.
R. FISCHER

BY Glascock, Downing + Seebold
ATTORNEYS

United States Patent Office 3,563,073
Patented Feb. 16, 1971

3,563,073
DEVICE FOR COMPENSATING FOR THE SPRINGING IN MACHINES, PARTICULARLY IN FORGING PRESSES AND THE LIKE
Rolf Fischer, Buderich, Germany, assignor to Schloemann Aktiengesellschaft, Dusseldorf, Germany, a company of Germany
Filed Mar. 12, 1968, Ser. No. 712,548
Claims priority, application Germany, Mar. 14, 1967, Sch 40,390
Int. Cl. B21j 9/20
U.S. Cl. 72—31
1 Claim

ABSTRACT OF THE DISCLOSURE

A device to indicate the springing in hydraulically operated plant, particularly in forging presses, wherein the travel of a movable part of the plant relative to a stationary part is measured by means of a stationary travel-indicator which includes a movable element which is displaceable in and opposite to the direction of the stroke movement of the movable machine part.

---

Figure 1A:
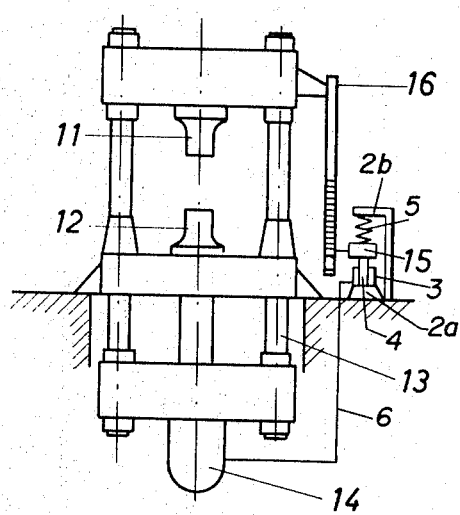

The press cylinder of the plant is connected with an auxiliary cylinder and an auxiliary piston slidable therein, the travel-indicator being carried by the auxiliary piston, and being supported by a spring upon a stationary part of the apparatus.

In machines of various kinds, and particularly in forging presses, the position of one movable machine part relative to another, for instance the position of an upper saddle in relation to a lower saddle in a forging press, is transmitted by way of a toothed rack secured to the movable machine part, upon a stationarily arranged electrical travel-indicator or way-giver, and in this way the particular position of the upper saddle in relation to the lower saddle is located, whereby the maintenance of an accurate forging dimension is made possible.

The arrangement of the travel-indicator, which, in forging presses, effects the measurement of travel practically without backlash, by way of a toothed rack fixedly connected with the movable machine part, may be different in dependence upon the type of press construction.

In consequence of the springing of the plant under load, however, the determination of a measurement value does not vary proportionally to the change of distance between the upper and lower saddles, since the springing travel enters into the measurement, with the result that the workpiece undergoes an error as regards the accuracy of its measured dimension. Thus the spring of the plant is composed of the springing of the machine stand, including the platen, in consequence of tensile, compressive and bending stresses, the table displacement, and the tools.

It is the object of this invention to obviate the error, occasioned by the springing of the plant, as regards the accuracy of the dimensions of the workpiece.

For the attainment of this object the travel indicator is so arranged as to be displaceable in and against the direction of the stroke movement of the movable machine part. The travel-indicator is mounted in a stationary housing and urged in one direction by an auxiliary piston and in the opposite direction by way of a spring member in relation to its stationary housing, the auxiliary cylinder that guides the auxiliary piston being connected with an inlet pipe whch admits pressure fluid to the press cylinder. The spring member has a curve of elasticity corresponding to the springing of the plant. It is thereby possible so to vary the position of the travel-indicator, correspondingly to the springing of the plant under load, that the travel-indicator follows the springing travel of the plant, so that no error of measurement of the actual path travelled by the movable machine part in the actual stroke can occur. It would indeed also be possible to preclude this error by means of an electrical measurement-compensating device, but such a device would be very expensive, whereas the device according to the present invention is distinguished by its simplicity and its reliability of operation, and above all by the smallness of its cost.

Figure 1B:
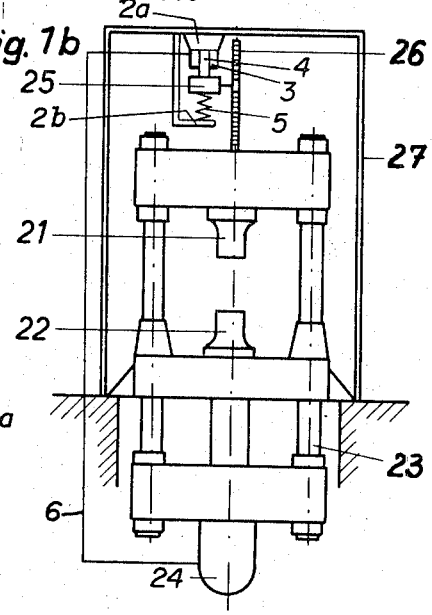
Figure 1C:
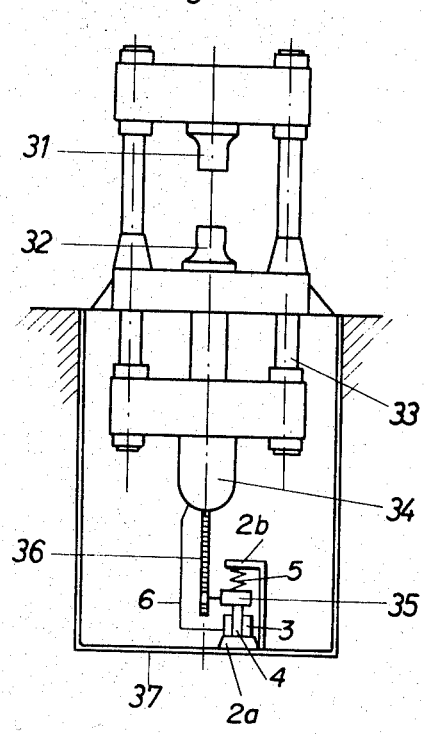
Figure 2:
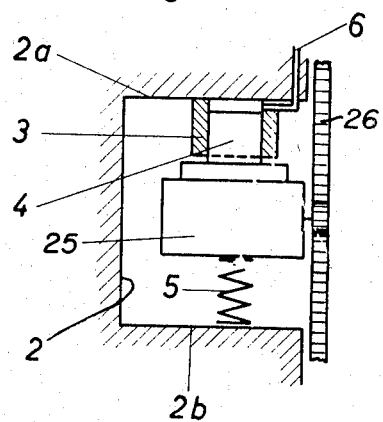

The invention is illustrated by way of example in the accompanying drawings, in which:

FIGS. 1a, 1b and 1c illustrate the principle of forging presses with underground drive; and FIG. 2 illustrates on a larger scale the arrangement, according to the invention, of the travel-indicator or way-giver in relation to its fixed point.

In FIGS. 1a to 1c, various possible arrangements of travel-indicators in forging presses with underground drive are illustrated in principle. In all these cases, the stroke of the upper saddle is transmitted by means of the pinion of a rack-and-pinion gear to a movable travel-indicator mounted in a stationary housing. Since, in the springing of the plant, in consequence of the compressive forces coming into action upon the forging, even the toothed-rack drive, according to the structure, more or less follows the springing, a faulty measurement of the stroke travel would be the result if the springing travel could not be compensated in relation to the position of the travel-indicator.

In FIG. 1a, with an underground drive, an upper saddle 11 is movable relatively to a lower saddle 12, a press cylinder 14 being interposed between the lower saddle 12 and tension rodding 13, which moves the upper saddle 11.

A travel-indicator 15 is connected by way of a toothed rack 16, with the tension rodding 13, and is mounted in a housing 2a, 2b supported upon the foundation.

In FIG. 1b an upper saddle 21 is movable by an underground drive towards a lower saddle 22, by the action of press cylinder 24 interposed between the lower saddle 22 and tension rodding 23 moving the upper saddle. A travel-indicator 25, which is connected by way of a toothed rack 26 with the tension rodding 23, is mounted in a housing 2a, 2b supported on a stationary frame 27.

In FIG. 1c, an upper saddle 31 is movable by an underground drive relatively to a lower saddle 32, a press cylinder 34 being supported between the lower saddle 32 and tension rodding 33, which moves the upper saddle 31. A travel-indicator 35, which is connected by way of a toothed rack 36 with the tension rodding 33, is mounted in a housing 2a, 2b secured upon the foundation or upon a stationary frame 37.

As illustrated in FIG. 2, a travel-indicator 1, mounted in a stationary chamber or housing 2, is so arranged as to be displaceable in and against the direction of the stroke movement of the movable machine part. For this purpose the travel-indicator 1 is supported relatively to upper side 2a of the stationary housing by way of an auxiliary piston 4 guided in a stationary cylinder 3, and in relation to the lower side 2b of the stationary housing by way of a compression spring 5 which bears on the underside 2b of the housing 2, and, which has an elasticity characteristic corresponding to the springing of the plant. The cylinder 3 is connected, by way of an inlet pipe 6 for pressure fluid, with the pressure-fluid pipe of the press cylinder of the forging press, so that the position of travel-indicator 1 is varied to correspond to the expansion of the stand.

When one of the press cylinders 14, 24 or 34 is supplied with pressure fluid, the pressure fluid is at the same time supplied, by way of the pressure-fluid inlet pipe 6, to the cylinder 3, so that its auxiliary piston, and therefore also the travel-indicator 1, against the pressure of the spring member 5, are displaced, correspondingly to the springing of the plant, in the direction of the springing travel upon loading, and against the latter when unloading.

A corresponding application is possible likewise in forging presses with the drive above ground.

An arrangement of the press cylinders 14, 24, 34 is likewise possible in such a way that the cylinders are secured to the lower saddle, and the press piston rods, to the tension rodding of the forging press.

I claim:

1. Means for measuring the travel of a forging tool in a hydraulically actuated forging press, comprising: a stationary housing, a movable travel-indicator mounted in the said housing, rack-and-pinion gear including a toothed rack fixed to a movable member of the press and a pinion meshing with the said rack and operatively connected with the travel-indicator, a stationary cylinder in the said housing, an auxiliary piston slidable in this cylinder and bearing against the travel-indicator, piping connecting this cylinder with the press cylinder, and a compression spring interposed between the travel-indicator and a stationary member of the housing, the resistance of this spring being proportional to the extension of the press frame under pressure.

References Cited

UNITED STATES PATENTS

| | | | |
|---|---|---|---|
| 3,024,676 | 3/1962 | Howahr | 72—453 |
| 3,158,046 | 11/1964 | Steinfort | 72—453 |
| 3,192,751 | 7/1965 | Baker | 100—99 |
| 3,411,345 | 11/1968 | Wintriss | 100—99 |

CHARLES W. LANHAM, Primary Examiner

G. P. CROSBY, Assistant Examiner

U.S. Cl. X.R.

72—453; 73—94; 100—99